Patented Sept. 7, 1926.

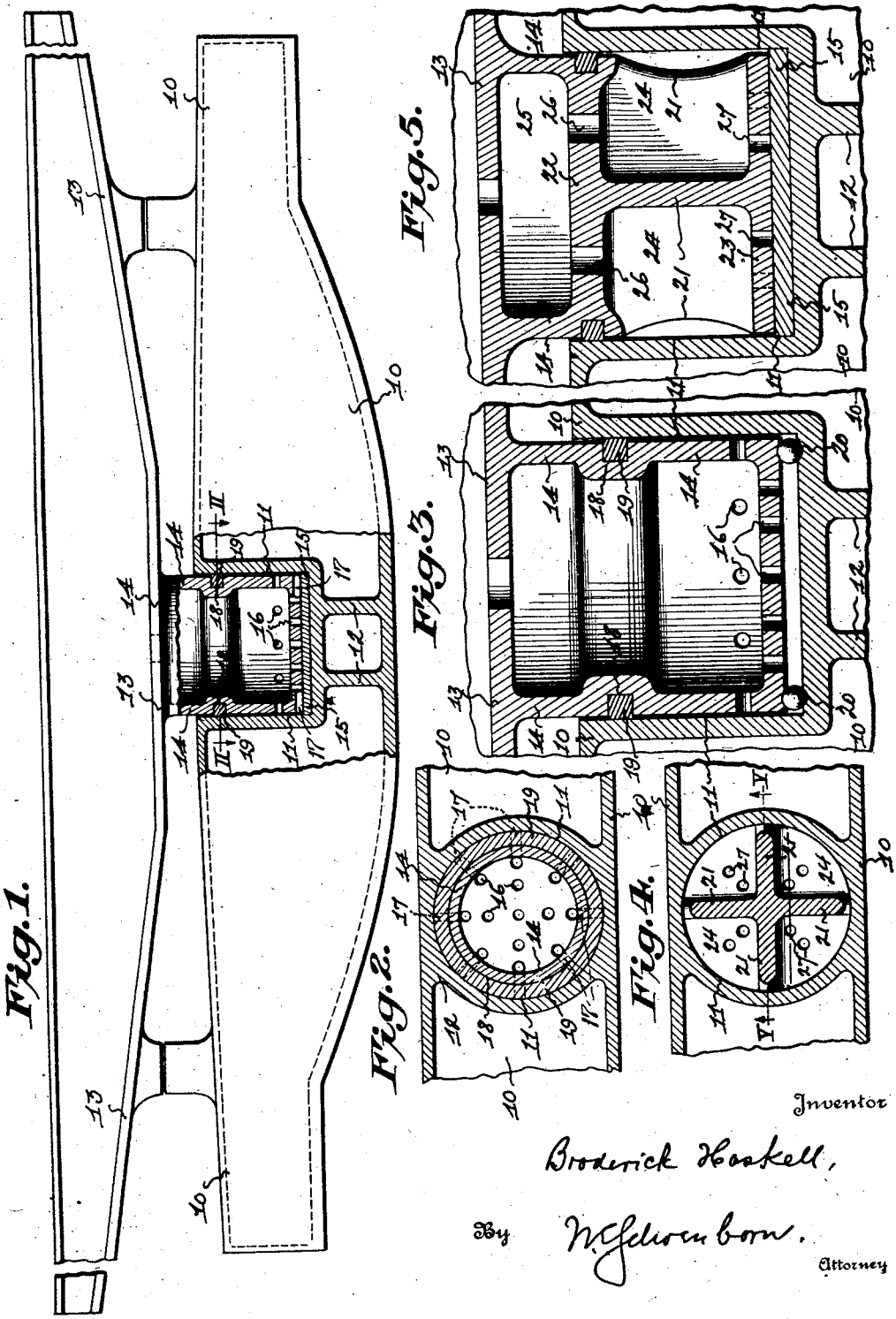

1,598,909

UNITED STATES PATENT OFFICE.

BRODERICK HASKELL, OF FRANKLIN, PENNSYLVANIA.

LUBRICATED CENTER BEARING FOR CAR TRUCKS.

Application filed January 17, 1925. Serial No. 3,037.

This invention relates to center bearings or plates for railroad car trucks and more especially for the proper lubrication of said bearings under all conditions of service.

The objects of the invention are:—

First, to provide a bearing of the character above indicated which will constantly, easily, permanently and automatically lubricate the bearing surface or surfaces between the body bolster and truck bolster of a car truck.

Second, to provide a bearing of the character above referred to which will be simple in character, and consists of a minimum of parts, cost of production, readily inspected, easily applied and requiring no skilled labor to install or adjust the same to keep the bearing and lubrication of the same in efficient and constant operation.

Third, to provide a bearing for car trucks which will reduce to a minimum the friction of the flanges of the wheels on the rails of curves, thereby increasing the life of said wheels and rails and materially reduce the cost of maintenance of the rolling stock and road-bed of the railroad.

Fourth, to provide a bearing for car trucks in which a single lubricant reservoir or container is provided, said reservoir being made a part of the body bolster of the truck and forming the pivotal pin or male member seated in the bearing recess or female member formed within the body or casting of the truck bolster.

Fifth, other objects and advantages of the invention will appear from the detailed construction and combination of the parts, manner of assembling the same and mode of operation to be hereinafter more fully described.

The invention consists of structural characteristics and relative arrangements of elements, which will be presently more fully disclosed and particularly pointed out in the appended claims.

In the drawings, in which similar reference characters indicate the same parts in the several figures:

Figure 1 is a front elevation of a body bolster and truck bolster and showing in fragmentary section the center bearing between said bolsters.

Figure 2 is a longitudinal section on line II—II of Figure 1.

Figure 3 is a vertical section of a modified form of the center bearing on an enlarged scale.

Figure 4 is a longitudinal section of a further modified form of the center bearing on the same scale as shown in Figures 1 and 2, and Figure 5 is a vertical section on line V—V of Figure 4 on the same scale as Figure 3.

Referring to Figures 1 and 2 of the drawings, 10 is the truck bolster which may be of cast metal and hollow as is usual in this class of inventions, and is provided at its center portion or section with a cylindrical recess or circular depression or well 11 below the upper surface of the truck bolster, the walls of said well 11 are cast integral with and within the body of the truck bolster, said walls of said depression 11 forming the female portion or member of the center bearing, and the bottom portion of said female portion may be supported by flanges or webs 12 cast within the body of the bolster and made integral with the bolster casting and said bottom portion.

13 is a body bolster having cast or made integral therewith at its center portion a depending hollow cylindrical projection 14 extending from the lower face of the body and forming the male member of the bearing, and said male member 14 is of such length and diameter as to be seated with a loose fit within the depression 11 or female member of the bearing, as clearly shown in Figure 1, the interior of said hollow projection 14 adapted to act as a reservoir or container for any form of lubricant, as oil, semi-grease or heavy grease.

15 is a friction-reducing bearing disc or plate of any desired and different metal placed between the bottom of the recess 11 and outer surface of the bottom section of the projection 14, as shown in Figure 1. The lower section of the projection 14 is provided with a series of passageways, apertures of openings 16, which permit any lubricant within the hollow projection or male member 14 to pass between walls forming the recess or female member 11 and the outer and contiguous surfaces of said projection or male member 14, thereby insuring a constant and automatic lubrication at all times between the engaging or contacting surfaces of said projection 14 and recess 11 of the center bearing.

The bottom surface of the projection 14 may be provided with radial grooves 17, see Figures 1 and 2, to permit and insure the passage of the lubricant to all sections and surfaces of the sides and bottom of the center bearing.

At the upper portion and in the outer surface of the projection 14 is formed a circular groove or recess 18 adapted to receive a fibrous packing or packing ring 19 to confine the lubricant within the center bearing and prevent the lubricant from being forced out through the clearance space between the projection 14 and depression 11, as will be readily understood.

Figure 3 shows in sectional view and on an enlarged scale a modified form of the center bearing portion, shown in Figures 1 and 2, in which roller bearings 20, 20, are substituted for the bearing plate or friction-reducing disk 15, illustrated in Figure 1.

In Figures 4 and 5 is shown a further modified form, wherein the outer cylindrical or upright wall of the projection or male member 14 of Figures 1 and 2 has been removed and radial upright sections or walls 21, 21 are cast integral with the top and bottom portions 22 and 23. thereby forming a plurality of side open pockets or lubricant-retaining chambers 24, 24, said side open pockets having their upper portions communicating with an upper reservoir 25 by means of passages or openings 26, 26, as shown in Figure 5. The lower sections of the lubricant chambers 24, 24 communicate by means of openings 27, 27 with the bottom of the recess or female member 11 of the truck bolster 10.

From the foregoing description of the construction and arrangement of the several parts comprising the center bearing for railway cars, and manner of assembling and operation of the same, it will be apparent that all the advantages and objects recited in the statement of invention have been fully and efficiently carried out and that the herein disclosed bearing is dust-proof, strong in its proportions and construction, so as to enable the same to resist the maximum of loads and strains to which such bearings are called upon to resist, is self-contained and fully protected in the castings of the truck and body bolsters and at all times will be amply and automatically lubricated under all conditions of service with a minimum of attention and repairs.

While I have shown and described the preferred forms of the device, it will be manifest that many changes and arrangements will readily suggest themselves as to the form and detailed construction of the bearing elements or as to integrally combining said bearing elements into the castings of the body and truck bolsters without in any way departing from the spirit of the present invention or changing the function and cooperation of the elements as expressed in the claims.

What I claim is:

1. A center bearing for a car truck comprising a truck bolster having a recess below its upper face and forming a well and recess in the female member of the bearing, a body bolster having projecting from its lower face a hollow tubular extension adapted to be loosely seated within the recess or well and extend below the top wall of said truck bolster and forming the male member of the bearing and constituting the sole connection between said bolsters, said hollow extension so constructed, arranged and adapted to receive and retain a lubricant and distribute the same between the walls of the recess in the truck bolster and the outer section of the extension of the body bolster.

2. A center bearing for a car truck comprising a truck bolster having a depressed circular recess below its upper face and extending into the body of the truck bolster and forming a well and the female member of the bearing, a body bolster having projecting from its lower face an integral hollow cylindrical extension adapted to be loosely seated within the depressed circular recess or well and extend below the top wall of said truck bolster and forming the male member of the bearing and constituting the sole connection between said bolsters, said hollow cylindrical extension so constructed, arranged and adapted to receive and retain a lubricant and distribute the same between the walls of the depressed recess in the truck bolster and the outer walls of the cylindrical extension of the body bolster, and a friction reducing means introduced between the bottom of the recess and the lower end of the extension.

3. A center bearing for a car truck comprising a truck bolster having a recess below its upper face and forming a well and recess in the female member of the bearing, a body bolster having projecting from its lower face a cylindrical extension adapted to be loosely seated within the recess or well and extend below the top wall of said truck bolster and forming the male member of the bearing and constituting the sole connection between the said bolsters.

4. A center bearing for a car truck comprising a truck bolster having a recess in its upper face and forming the female member of the bearing, a body bolster having projecting from its lower face a hollow extension adapted to be loosely seated within the recess of said truck bolster and forming the male member of the bearing, said hollow cylindrical extension having grooves in the under surface of its lower end, and so constructed, arranged and adapted to receive a lubricant and distribute the same between the walls of the recess in the truck bolster and the outer or contiguous walls of the extension of the body bolster.

In testimony whereof I hereto affix my signature.

BRODERICK HASKELL.